United States Patent
Horski et al.

(10) Patent No.: US 7,309,207 B2
(45) Date of Patent: Dec. 18, 2007

(54) FAN SHROUD STRUCTURE REINFORCEMENT TO REDUCE OR ELIMINATE WARPING AND DISTORTION

(75) Inventors: Marek Horski, London (CA); Bonifacio Castillo, London (CA)

(73) Assignee: Siemens VDO Automotive Canada Inc., Chatham (CA)

( * ) Notice: Subject to any disclaimer, the term of this patent is extended or adjusted under 35 U.S.C. 154(b) by 0 days.

(21) Appl. No.: 11/415,294

(22) Filed: May 2, 2006

(65) Prior Publication Data

US 2007/0048138 A1 Mar. 1, 2007

Related U.S. Application Data

(60) Provisional application No. 60/712,062, filed on Aug. 29, 2005.

(51) Int. Cl.
F01D 25/04 (2006.01)
F04D 29/66 (2006.01)
(52) U.S. Cl. ........................ 415/119; 416/189
(58) Field of Classification Search ............ 123/41.49; 415/119, 211.2, 213.1, 228; 416/169 A, 416/189; 417/423.15
See application file for complete search history.

(56) References Cited

U.S. PATENT DOCUMENTS

| | | | | |
|---|---|---|---|---|
| 6,106,228 A | * | 8/2000 | Bartlett | 415/146 |
| 6,123,051 A | * | 9/2000 | Kubina et al. | 123/41.49 |
| 6,309,176 B1 | * | 10/2001 | Periyathamby et al. | 415/119 |
| 6,883,589 B2 | * | 4/2005 | Ozawa et al. | 165/41 |

* cited by examiner

*Primary Examiner*—Edward K. Look
*Assistant Examiner*—Nathan Wiehe

(57) ABSTRACT

A fan shroud structure (10) is constructed and arranged to carry a fan and motor. The fan shroud structure includes a base (12) and an annular rim (24) extending from the base. The rim defines a generally central opening (26) sized to accommodate blades of a fan. Motor mounting structure (28) is coupled with the rim (24) and is disposed generally adjacent to the central opening (26). The motor mounting structure (28) is constructed and arranged to support a motor for driving a fan. The fan shroud structure (10) includes a first pair of opposing sides (14, 16) and a second pair of opposing sides (17, 18) coupled to the base to form a box-like configuration defining a perimeter of the fan shroud structure raised with respect to the base such that the sides are discontinuous with respect to the base (12) to shift resonance of the shroud structure.

15 Claims, 3 Drawing Sheets

FAN SHROUD STRUCTURE REINFORCEMENT TO REDUCE OR ELIMINATE WARPING AND DISTORTION

This application claims the benefit of the earlier filing date of U.S. Provisional Application No. 60/712,062, filed on Aug. 29, 2005, which is incorporated by reference herein in its entirety.

FIELD OF THE INVENTION

The invention relates to a fan shroud structures for heating, ventilation and air conditioning (HVAC) systems of automobiles.

BACKGROUND OF THE INVENTION

Conventional fan shrouds that are of box shape are excitable (by resonance) in the operating range of the fan motor or other periodic signals in the machine the fan is placed in, such as a vehicle. In addition, due to the box-like structure of typical shrouds, there is a need for substantial structural reinforcement to minimize warping and distortion. However, the use of such reinforcement can increase the complexity of manufacturability (e.g. moldability) of the shroud and increase the cost of materials, while adversely affecting airflow properties.

Thus, there is a need to provide a cost-effective, moldable fan shroud structure that reduces or eliminates warping and distortion and reduces resonance.

SUMMARY OF THE INVENTION

An object of the invention is to fulfill the need referred to above. In accordance with the principles of the present invention, this objective is achieved by providing a fan shroud structure that includes a base. An annular rim extends from the base and defines a generally central opening sized to accommodate blades of a fan. Motor mounting structure is coupled with the annular rim and is disposed generally adjacent to the central opening. The motor mounting structure is constructed and arranged to support a motor for driving the fan. A first pair of opposing sides and a second pair of opposing sides are coupled to the base to form a box-like configuration defining a perimeter of the fan shroud structure that is raised with respect to the base so that the sides are discontinuous with respect to the base to shift resonance of the shroud structure.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 1:
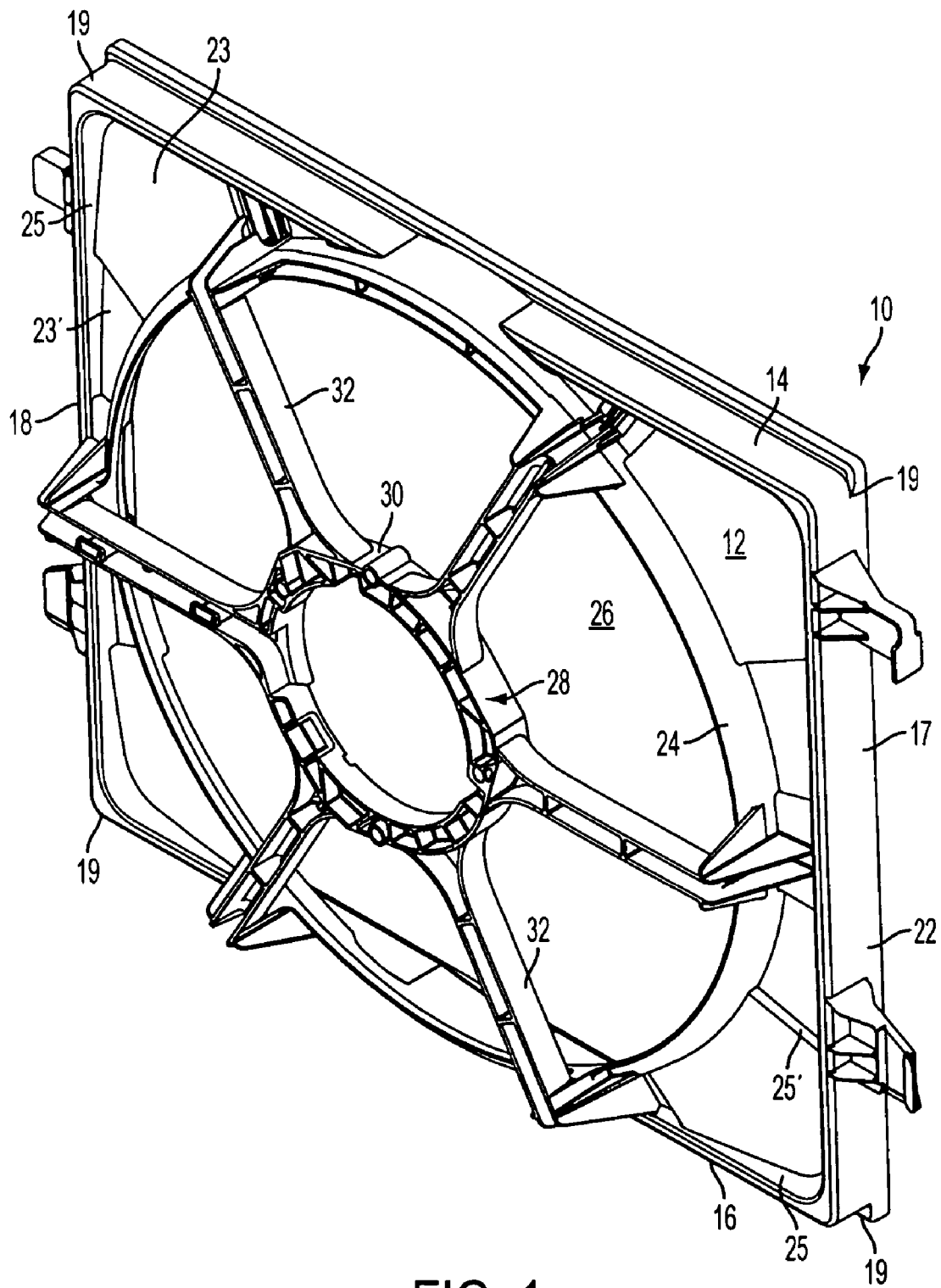
FIG. 1 is a front perspective view of a fan shroud structure provided in accordance with the principles of the present invention shown in a vertical orientation.
Figure 2:
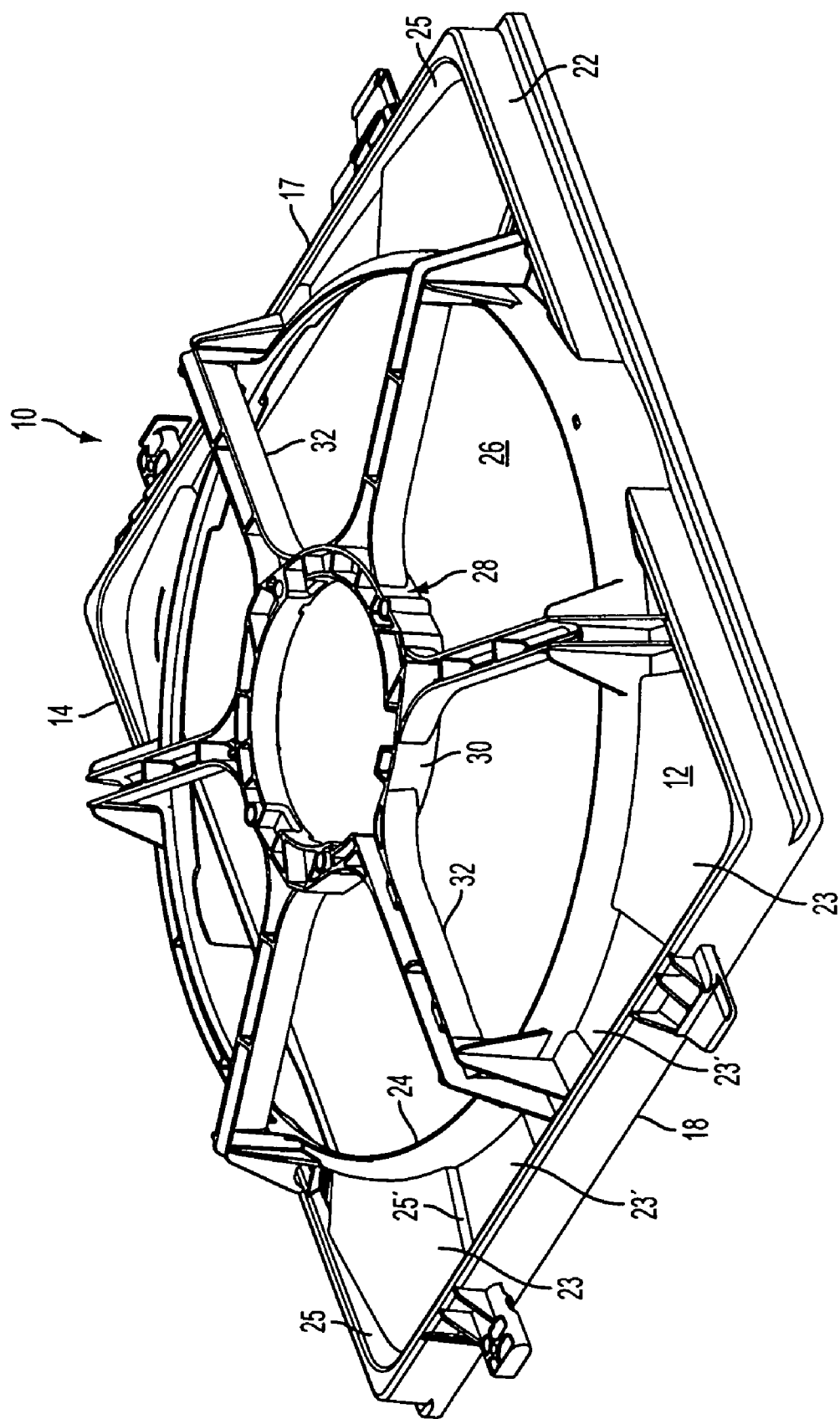
FIG. 2 is a front perspective view of the fan shroud structure provided in accordance with the principles of the present invention shown in a horizontal orientation.
Figure 3:
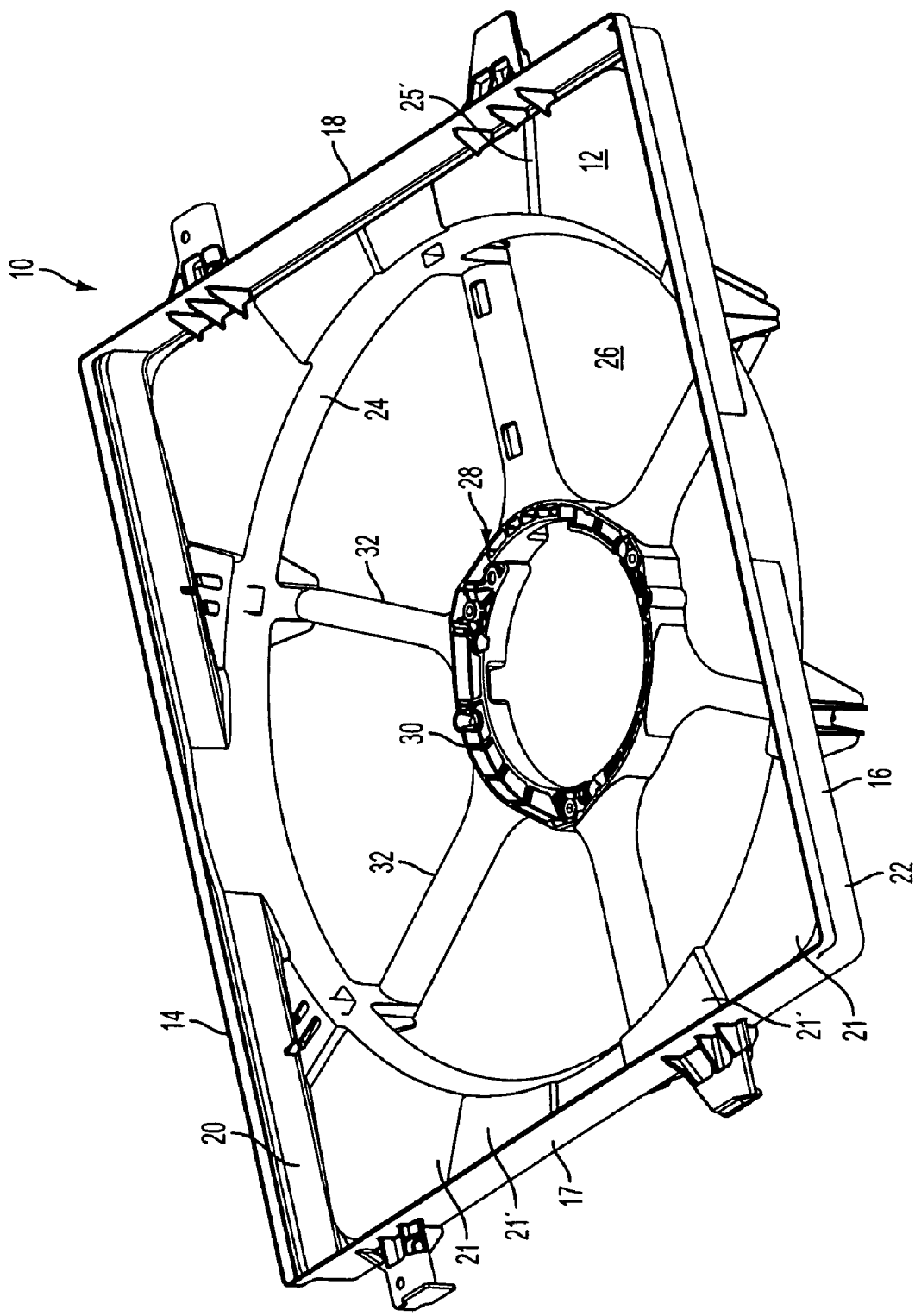
FIG. 3 is a rear perspective view of the fan shroud structure of FIG. 2.

With reference to FIGS. 1-3, a fan shroud structure, generally indicated at 10, is shown in accordance with the principles of the present invention. The fan shroud structure 10 is preferably molded from plastic or composite material.

The fan shroud structure 10 is preferably part of a fan module that is configured to be mounted between a condenser and a radiator in a vehicle. The fan shroud structure 10 includes a shroud base 12. A pair of opposing first sides 14 and 16 and a pair opposing second sides 17 and 18 are joined with the base 12 and extend or rise from the base 12. The first sides 14 and 16 are joined with the second sides 17 and 18 at corners 19 so as to form a box-like configuration defining a raised perimeter having an inner periphery 20 (FIG. 3) and an outer periphery 22 (FIG. 1). As shown in FIG. 3, the sides 14, 16, 17 and 18 are raised with respect to adjacent surfaces 21 and 21' that define a bottom of base 12. Surfaces 21 and 21' are discontinuous (on different planes) to shift resonance of the shroud structure 10. Also, with reference to FIGS. 1 and 2, the sides 14, 16, 17 and 18 are raised with respect to surfaces 23 and 23' that define a top of base 12. Surfaces 23 and 23' are also discontinuous (since they are the complementary surfaces of surfaces 21 and 21') to shift resonance of the shroud structure 10. The sides 14, 16, 17 and 18 are joined to the base surfaces, 21, 21' and 23, 23' by an angled surface 25. Thus, the sides 14, 16, 17 and 18 are discontinuous with the base 12. As shown, the sides 14, 16, 17 and 18 define ribbing structure having a raised and angled perimeter edge that defines a geometrical discontinuity in the fan shroud structure 10. The sides 14, 16, 17 and 18 provide greater stiffness compared to conventional ribbing reinforcement of similar plastic or composite structures.

An annular rim 24 extends outwardly from the base 12. The rim 24 defines a central opening 26 sized to accommodate fan blades (not shown). The shroud structure 10 also includes motor mounting structure, generally indicated at 28, disposed generally adjacent to the central opening 26. The motor mounting structure 28 preferably includes a motor mounting base 30 supported in the central opening 26 via support arms 32 coupled to the rim 24. A fan motor (not shown) can be mounted to the base 30 of the motor mounting structure 28.

Local resonance in the fan shroud structure 10 that are excitable in the operating range of the fan motor (when mounted to the fan shroud structure 10) or other periodic signals in the automobile can be shifted or eliminated by the discontinuities between surfaces 21 and 21', between surfaces 23 and 23' and the discontinuities provided by the angled surface 25 that joins the raised sides 14, 16, 17 and 18 to the base 12 of the fan shroud structure 10.

The moldability of the fan shroud structure 10 is enhanced or maintained using an angled surface 25' for each successive geometric step (e.g. between surfaces 21 and 21' and between surfaces 23 and 23') and for the shroud raised sides e.g. surface 25). A higher frequency fan shroud structure 10 (frequency of around 40 Hz or greater) made of engineered thermoplastic and/or composite material can be achieve with less mass than conventional shroud structures.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A fan shroud structure comprising:

a base, an annular rim extending from the base, the annular rim defining a generally central opening sized to accommodate blades of a fan, motor mounting structure coupled with the annular rim and disposed generally adjacent to the central opening, the motor mounting structure being constructed and arranged to support a motor for driving a fan, and a first pair of opposing sides and a second pair of opposing sides coupled to the base to form a box-like configuration defining a perimeter of the fan shroud structure that is raised with respect to the base so that the sides are discontinuous with respect to the base, wherein the base includes adjacent, permanently stationary and generally parallel, discontinuous surfaces constructed and arranged to shift resonance of the structure.

2. The structure of claim 1, wherein an angled surface joins the sides to the base.

3. The structure of claim 1, wherein the adjacent surfaces are joined by an angled surface.

4. The structure of claim 1, wherein the base includes a top and a bottom surface, each of the top and bottom surfaces including the discontinuous surfaces.

5. The structure of claim 4, wherein the adjacent surfaces are joined by an angled surface.

6. The structure of claim 1, wherein the annular rim extends outwardly from the base.

7. The structure of claim 1, wherein the structure is composed of one of plastic and composite material.

8. The structure of claim 1, wherein the motor mounting structure is coupled to the annular rim by a plurality of support arms.

9. A fan shroud structure comprising:

a base having a top and a bottom, an annular rim extending from the base, the annular rim defining a generally central opening sized to accommodate blades of a fan, motor mounting structure coupled with the annular rim via a plurality of support arms, the motor mounting structure being disposed generally adjacent to the central opening and being constructed and arranged to support a motor for driving a fan, and a first pair of opposing sides and a second pair of opposing sides coupled to the base to form a box-like configuration defining a perimeter of the fan shroud structure that is raised with respect to each of the top and the bottom of the base so that the sides are discontinuous with respect to the base, the sides being joined directly with the base by an obtuse angled surface.

10. The structure of claim 9, wherein the base includes adjacent, permanently stationary and generally parallel, discontinuous surfaces constructed and arranged to shift resonance of the structure.

11. The structure of claim 10, wherein the adjacent surfaces are joined by an angled surface.

12. The structure of claim 11, wherein each of the top and bottom surfaces includes the discontinuous surfaces.

13. The structure of claim 12, wherein the adjacent surfaces are joined by an angled surface.

14. The structure of claim 9, wherein the annular rim extends outwardly from the base.

15. The structure of claim 9, wherein the structure is composed of one of plastic and composite material.

* * * * *